Patented Jan. 19, 1965

3,166,400
METHOD FOR THE CONTROL OF UNDESIRABLE PLANT GROWTH
Albert W. Lutz, Princeton, and Bryant L. Walworth, Pennington, N.J., assignors to American Cyanamid Company, Stamford, Conn., a corporation of Maine
No Drawing. Filed Dec. 3, 1962, Ser. No. 241,502
5 Claims. (Cl. 71—2.5)

This invention relates to herbicidal compositions. More particularly, it relates to herbicidal compositions containing as their active ingredient a disubstituted s-tetrazine, and to methods for their utilization. Still more particularly, the invention relates to herbicidal compositions containing a disubstituted s-tetrazine having the general formula:

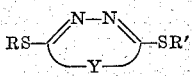

wherein R and R' are lower alkyl and lower alkenyl of from 1 to 4 carbon atoms, and Y is a linking bridge of the structure:

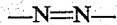

or

The disubstituted s-tetrazines which can be employed in the present invention are:

3,6-bis(methylthio)-1,2-dihydro-s-tetrazine,
3,6-bis(methylthio)-s-tetrazine,
3,6-bis(ethylthio)-1,2-dihydro-s-tetrazine,
3,6-bis(ethylthio)-s-tetrazine,
3,6-bis(n-propylthio)-1,2-dihydro-s-tetrazine,
3,6-bis(allylthio)-s-tetrazine,
3,6-bis(t-butylthio)-s-tetrazine,
3-(methylthio), 6-(ethylthio)-s-tetrazine,
3-(ethylthio), 6-(t-butylthio)-s-tetrazine, and
3-(allylthio), 6-(methylthio)-s-tetrazine.

The disubstituted s-tetrazines employed in the compositions of the present invention can be prepared according to any desired procedure known in the art as illustrated, for instance, by a method disclosed in Acta Chem. Scand., vol. 15, 1575 (1961).

In general, the herbicidal compositions of the present invention are prepared by admixing the active compound with an inert carrier material of the type referred to in the art as pest control adjuvants in solid or liquid form. Typical carriers include: the talcs, clays, pumice, silica, diatomaceous earth, walnut flour, chalk and equivalents of the same.

Liquid compositions may be prepared by dissolving the active compound in water or by dissolving it initially in common organic solvents, and then admixing the solutions with water, either with or without an emulsifying agent. The disubstituted s-tetrazines are quite soluble in common organic solvents, such as actone, methyl isobutyl ketone, dioxane, isopropyl acetate, ethanol, xylene, dimethyl sulfoxide or dimethyl formamide.

Surface-active agents, or emulsifiers, which can be herein employed, are those normally used in the preparation of oil-in-water emulsions. Illustrative of the latter are ionic and non-ionic dispersing or emulsifying agents, such as the higher alkylaryl sulfonates, sodium lignin sulfonate, polyglycol ethers or sodium dioctyl sulfosuccinate. Emulsifying agents are employed in low concentrations usually in the range of from about 0.1% to about 2% by weight of the total weight of the composition.

The compounds of the present invention may be applied either as a spray, as a dust, or as a wettable powder to the locus to be protected from undesirable plant growth. The amount of disubstituted s-tetrazine compound in the herbicidal composition will vary in the manner and purpose for which the composition is to be so-employed. Concentrations for subsequent use in preparing spray formulations may contain as much as 90% or more by weight of the active ingredient. Sprays or dusts for direct use will be relatively dilute, in some instances as low as 0.5%, or less.

The invention will be further illustrated by the following examples. These are not to be taken as limitative of the invention. Unless otherwise noted, all parts are by weight.

EXAMPLE A

Preparation of 3,6-bis(methylthio)-1,2-dihydro-s-tetrazine and 3,6-bis(methylthio)-s-tetrazine 14.8 parts of dithiourazine are dissolved in 200 parts (by volume) of 1 N sodium hydroxide in a suitable reaction vessel. 28.4 parts of methyliodide in 100 parts (by volume) of 95% ethanol are added to the dissolved dithiourazine. Resultant mixture is stirred at room temperature for about three hours. The solid 3,6-bis(methylthio)-1,2-dihydro-s-tetrazine is collected and dried yielding 12.8 parts of product having a melting point equal to 194° C.–198° C.

Crude product is then dissolved in absolute hot ethanol. Upon addition of 2 N ferric chloride, a red solid precipitates and is collected and dried, yielding 65.5% of 3,6-bis(methylthio)-s-tetrazine having a melting point equal to 83.5° C. to 84° C.

EXAMPLE B

Substituting allyl bromide for the methyliodide reactant above, the corresponding 3,6-bis(allylthio)-1,2-dihydro-s-tetrazine in 67% yield and having a melting point of 86° C. to 87.5° C. is obtained.

The corresponding bis(ethylthio), bis(n-propylthio) and bis(t-butylthio)-s-tetrazines are prepared in the same manner as in the above example by employing in lieu of methyliodide, ethyl chloride, t-butyl bromide and equivalents thereof. Where unsymmetrical bis-alkylthio-s-tetrazine compounds are prepared, one mol of desired alkyl halide, such as methyliodide, is usually initially reacted and the reaction is completed by adding thereto a second mol of a different alkyl halide, such as ethyliodide or allyl bromide.

EXAMPLE C

Preparation of 3-(allylthio), 6-(methylthio)-1,2-dihydro-s-tetrazine 1.48 parts of diethiourazine are dissolved in 20 parts (by volume) of 1 N sodium hydroxide in a suitable reaction vessel. 1.2 parts of allyl bromide in 5 parts (by volume) of 95% ethanol are added to the dissolved dithiourazine. Resultant reaction mixture is stirred for about fifty minutes at room temperature. Solid impurities are then filtered off from the reaction mixture and to the filtrate recovered are added 1.4 parts of methyliodide in 5 parts (by volume) of 95% ethanol. The mixture is next stirred at room temperature for one-half hour. Resultant solid, 3-(allylthio), 6-(methylthio)-1,2-dihydro-s-tetrazine, is collected, dried and then recrystallized from cyclohexane. Light tan needles in 45% yield having a melting point between 107° C. and 109° C. are obtained.

The foregoing compounds are employed as compositions as illustrated in the following examples:

EXAMPLE 1

To demonstrate the effectiveness of the s-tetrazine compounds as pre-emergence herbicides prepared in Example A above, compositions prepared therefrom are subjected to the following tests:

Half-pint quantities of potting soil are separately mixed with seeds of wheat, radish, ryegrass, mustard, millet, pigweed, purslane, crabgrass and downy brome. These mixtures are then added to separate one pint cups containing about one inch of potting soil. Each cup is wet with twenty-five milliliters of tap water and then with twenty-five milliliters of the herbicidal solution being tested. The treatments are equivalent to 25 and 5 pounds of herbicide active ingredient per acre.

When the herbicidal solution is added to the various seeded containers, the containers are placed on greenhouse benches and attended in conventional manner. Three weeks following treatment, the containers are examined and the results of the test recorded. The results obtained with the above-mentioned disubstituted s-tetrazines applied pre-emergence are presented in Table I below.

*Table I*

| Test Species | Herbitoxicity Index* |  |  |  |
|---|---|---|---|---|
|  | 3,6-Bis(Methylthio)-1,2-Dihydro-s-Tetrazine, Pounds per Acre |  | 3,6-Bis(Methylthio)-s-Tetrazine, Pounds per Acre |  |
|  | 25 | 5 | 25 | 5 |
| Wheat | 4+ | — | 4+ | — |
| Radish | 5 | — | 5 | — |
| Ryegrass | 5 | — | 5 | — |
| Mustard | 5 | 5− | 5 | 4 |
| Millet | 5 | 5 | 5 | 4+ |
| Pigweed | 5 | 5 | 5 | 4+ |
| Purslane | 5 | 5 | 5 | 2 |
| Crabgrass | 5 | 5 | 5 | 4 |
| Downy Brome | 5 | 0 | 5− | 0 |

\* Herbitoxicity Index:
0 = No apparent effect.
1 = Slight injury.
2 = Moderate injury.
3 = Severe injury, no plants killed.
3+ = Severe injury, up to 50% plants killed.
4 = Severe injury, 50 to 75% plants killed.
4+ = Severe injury, 75 to 95% plants killed.
5− = Severe injury, 95 to 100% plants killed.
5 = All plants killed.

EXAMPLE 2

The post-emergence activity of the s-tetrazines hereinabove defined is evidenced by the results of the following tests in which vigorously growing monocotyledonous and dicotyledonous plants, about two weeks old, are treated with solutions containing disubstituted s-tetrazines.

In these tests, Canada thistle, millet, wheat, radish, tomato, mustard and crabgrass growing in small containers in the greenhouse are sprayed to the point of runoff with solutions containing a predetermined amount of test compound in a 50% acetone/water mixture. The compounds tested are those of Examples A and B, above. The treatments are equivalent to 12.5 pounds of herbicide active ingredient per acre.

Treated plants are placed in the greenhouse and results are recorded three weeks after treatment. The data obtained in these post-emergence tests are recorded in Table II below, and the herbitoxicity index used in this table is the same as that provided in Table I, above. Compounds (1), (2) and (3) set forth in Table II below are, respectively: 3,6-bis(methylthio)-s-tetrazine, 3-6-bis(methylthio)-1,2-dihydro-s-tetrazine and 3,6-bis(allylthio)-1,2-dihydro-s-tetrazine.

*Table II*

| Test Species | Herbitoxicity Index* |  |  |
|---|---|---|---|
|  | Compound (1) (Example A) | Compound (2) (Example A) | Compound (3) (Example B) |
| Canada Thistle | 0 | 0 | 5 |
| Wheat | 3 | 0 | 1 |
| Radish | 2 | 4+ | 5 |
| Tomato | 4+ | 5− | 5 |
| Mustard | — | 5− | — |
| Crabgrass | 3 | 3 | 2 |

\* See footnote at end of Table I.

Similar results are obtained when employing in lieu of the foregoing s-tetrazines 3,6-bis(ethylthio)-1,2-dihydro-s-tetrazine, 3,6-bis(n-propylthio)-s-tetrazine, 3,6-bis(butylthio)-s-tetrazine and 3-(allylthio), 6-(methylthio)-1,2-dihydro-s-tetrazine.

We claim:
1. A method for the control of undesirable plant growth with comprises: applying to an area to be protected from such growth disubstituted s-tetrazines having the formula:

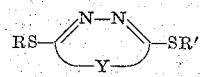

wherein R and R' each represents a substituent selected from the class consisting of lower alkyl and lower alkenyl, and Y is a linking bridge selected from the class consisting of —N=N— and —NH—NH—, in an amount sufficient to effect herbicidal action.

2. A method according to claim 1, wherein the s-tetrazine is 3,6-bis(methylthio)-1,2-dihydro-s-tetrazine.

3. A method according to claim 1, wherein the s-tetrazine is: 3,6-bis(methylthio)-s-tetrazine.

4. A method according to claim 1, wherein the s-tetrazine is: 3,6-bis(allylthio)-1,2-dihydro-s-tetrazine.

5. A method according to claim 1, wherein the s-tetrazine is: 3-(allylthio), 6-(methylthio)-1,2-dihydro-s-tetrazine.

References Cited in the file of this patent

Sadnstrom: Acta Chem. Scand., vol. 15, pages 1575 to 1582 (1961).